(12) United States Patent
Lutz et al.

(10) Patent No.: US 11,370,482 B2
(45) Date of Patent: Jun. 28, 2022

(54) HYDRAULIC STEERING SYSTEM

(71) Applicant: Master Solutions, Inc., Carlisle, PA (US)

(72) Inventors: David W. Lutz, Carlisle, PA (US); Steve Keitel, Mechanicsburg, PA (US)

(73) Assignee: Master Solutions, Inc., Carlisle, PA (US)

( * ) Notice: Subject to any disclaimer, the term of this patent is extended or adjusted under 35 U.S.C. 154(b) by 393 days.

(21) Appl. No.: 16/555,009

(22) Filed: Aug. 29, 2019

(65) Prior Publication Data

US 2020/0070877 A1 Mar. 5, 2020

Related U.S. Application Data

(60) Provisional application No. 62/724,678, filed on Aug. 30, 2018.

(51) Int. Cl.
| | |
|---|---|
| *B62D 6/00* | (2006.01) |
| *B62D 3/14* | (2006.01) |
| *B62D 12/02* | (2006.01) |
| *B60W 10/20* | (2006.01) |

(52) U.S. Cl.
CPC ............. *B62D 6/007* (2013.01); *B60W 10/20* (2013.01); *B62D 3/14* (2013.01); *B62D 12/02* (2013.01)

(58) Field of Classification Search
CPC ......... B60W 10/20; B62D 3/14; B62D 6/007; B62D 12/02; B62D 53/005; B62D 53/061; B62D 63/068; B62D 13/04; B62D 13/02; B62D 13/025; B62D 13/00

USPC ........................................................ 180/417
See application file for complete search history.

(56) References Cited

U.S. PATENT DOCUMENTS

| | | | | |
|---|---|---|---|---|
| 4,484,758 A | * | 11/1984 | Murray .................. | B62D 13/02 280/442 |
| 8,419,032 B1 | * | 4/2013 | McGhie ................. | B62D 13/04 280/124.157 |
| 2019/0329649 A1 | * | 10/2019 | Roger .................... | B60K 25/02 |

FOREIGN PATENT DOCUMENTS

| | | | | |
|---|---|---|---|---|
| CN | 105216860 A | * | 1/2016 | |
| EP | 3085217 A1 | * | 10/2016 | ........... B62D 13/025 |
| EP | 3459900 A1 | * | 3/2019 | ................ B60S 9/02 |

* cited by examiner

*Primary Examiner* — Tony H Winner
*Assistant Examiner* — Felicia L. Brittman
(74) *Attorney, Agent, or Firm* — The Webb Law Firm

(57) ABSTRACT

A trailer including a hydraulic steering system includes: a trailer body; a plurality of axles connected to the trailer body; a steering cylinder connected to at least one axle of the plurality of axles and configured to turn the at least one axle; a sensing cylinder; a controller; and a hydraulic steering system. The hydraulic steering system includes a hydraulic circuit including a plurality of hoses and valves, and the steering cylinder is in fluid communication with at least one of the sensing cylinder and the controller. The hydraulic steering system is configured to transition between: (1) an automatic steering mode and (2) a manual steering mode. A towing system and a method of steering a trailer are also disclosed.

20 Claims, 8 Drawing Sheets

HYDRAULIC STEERING SYSTEM

CROSS REFERENCE TO RELATED APPLICATIONS

This application claims priority to U.S. Provisional Patent Application No. 62/724,678, filed Aug. 30, 2018, the disclosure of which is hereby incorporated in its entirety by reference.

BACKGROUND

1. Field

The present disclosure relates to a hydraulic steering system configured to steer a trailer in either a manual steering mode or an automatic steering mode.

2. Technical Considerations

Trailers are attachable to cabs to haul loads of various shapes and sizes. Trailers, given their large size, can be difficult to steer. Further, at times, the load can be quite cumbersome (e.g., a wide load, a long load, a heavy load), which can make the trailer even more difficult to steer. The shape and size of certain roads over which the trailer travels (e.g., narrow roads, winding road, etc.) can also make steering the trailer difficult. As such, a trailer that enables flexibility in the steering thereof may make navigation of the trailer easier.

SUMMARY

The present invention is directed to a trailer including a hydraulic steering system including: a trailer body; a plurality of axles connected to the trailer body, where each of the plurality of axles is turnable; a steering cylinder connected to at least one axle of the plurality of axles and configured to turn the at least one axle; a sensing cylinder; a controller; and a hydraulic steering system, including a hydraulic circuit including a plurality of hoses and valves, the steering cylinder in fluid communication with at least one of the sensing cylinder and the controller, where the hydraulic steering system is configured to transition between: an automatic steering mode in which the sensing cylinder is in fluid communication with the steering cylinder to cause the steering cylinder to turn the at least one axle based on a movement of the sensing cylinder; and a manual steering mode in which the controller is in fluid communication with the steering cylinder to cause the steering cylinder to turn the at least one axle based on a user input.

The plurality of valves may include a plurality of poppet valves. In the automatic steering mode a first arrangement of the plurality of poppet valves may be open and closed, and in the manual steering mode a second arrangement of the plurality of poppet valves may be open and closed. A user may direct whether the hydraulic steering system is to operate in the automatic steering mode or the manual steering mode by selecting an automatic steering option or a manual steering option. In the manual steering mode, the user input may be received from an input located on the controller selected by a user and/or from a signal received by the controller from a remote controller input by the user. In the manual steering mode, the user input may be configured to cause a fluid to be flowed to and/or from the steering cylinder to cause the steering cylinder to turn the at least one axle. In the manual steering mode, the steering cylinder may not be controlled by the sensing cylinder. In the automatic steering mode, the sensing cylinder may be configured to flow fluid to and/or from the steering cylinder to cause the steering cylinder to turn the at least one axle. The sensing cylinder may be moved by co-action with a cab and/or jeep attached to the trailer. The trailer body may include a front half and a rear half, where the plurality of axles include a first set of axles connected to the front half and a second set of axles connected to the rear half, where the first set of axles and/or the second set of axles may be configured to be steered by the hydraulic steering system in the automatic steering mode. Only the second set of axles may be configured to be steered by the hydraulic steering system in the automatic steering mode. The sensing cylinder may be connected to a turning component. The sensing cylinder may be configured to cause the steering cylinder to turn the at least one axle based on a co-action between a kingpin of the trailer and a fifth wheel on a cab to which the trailer is connected.

The present invention is also directed to a towing system including: a cab; and a trailer including a trailer body; a plurality of axles connected to the trailer body, where each of the plurality of axles is turnable; a steering cylinder connected to at least one axle of the plurality of axles and configured to turn the at least one axle; a sensing cylinder; a controller; and a hydraulic steering system, including a hydraulic circuit including a plurality of hoses and valves, the steering cylinder in fluid communication with at least one of the sensing cylinder and the controller, where the hydraulic steering system is configured to transition between: an automatic steering mode in which the sensing cylinder is in fluid communication with the steering cylinder to cause the steering cylinder to turn the at least one axle based on a movement of the sensing cylinder; and a manual steering mode in which the controller is in fluid communication with the steering cylinder to cause the steering cylinder to turn the at least one axle based on a user input. The trailer is attached to the cab.

The towing system may further include a jeep attached to the cab, where the trailer may be attached to the jeep. The towing system may optionally include a jeep attached to the cab, where the trailer may be attached to the cab by a load spanning from the trailer to the jeep or the cab.

The present invention is also directed to a method of steering a trailer including a hydraulic steering system. The method includes providing a trailer including a hydraulic steering system including: a trailer body; a plurality of axles connected to the trailer body, where each of the plurality of axles is turnable; a steering cylinder connected to at least one axle of the plurality of axles and configured to turn the at least one axle; a sensing cylinder; a controller; and a hydraulic steering system, including a hydraulic circuit including a plurality of hoses and valves, the steering cylinder in fluid communication with at least one of the sensing cylinder and the controller, where the hydraulic steering system is configured to transition between: an automatic steering mode in which the sensing cylinder is in fluid communication with the steering cylinder to cause the steering cylinder to turn the at least one axle based on a movement of the sensing cylinder; and a manual steering mode in which the controller is in fluid communication with the steering cylinder to cause the steering cylinder to turn the at least one axle based on a user input. The method includes activating the automatic steering mode or the manual steering mode. The method includes steering the trailer.

The manual steering mode may be activated with the trailer steered at a speed maintained at or below 10 miles per hour. The trailer body may include a front half and a rear half, where the plurality of axles include a first set of axles connected to the front half and a second set of axles connected to the rear half, where steering the trailer may include steering the first set of axles and/or the second set of axles with the hydraulic steering system in the automatic steering mode. Upon the automatic steering mode being activated, no further user input may be required to steer the trailer in the automatic steering mode.

Further non-limiting embodiments are set forth in the following numbered clauses:

Clause 1: A trailer including a hydraulic steering system, comprising: a trailer body; a plurality of axles connected to the trailer body, wherein each of the plurality of axles is turnable; a steering cylinder connected to at least one axle of the plurality of axles and configured to turn the at least one axle; a sensing cylinder; a controller; and a hydraulic steering system, comprising a hydraulic circuit comprising a plurality of hoses and valves, the steering cylinder in fluid communication with at least one of the sensing cylinder and the controller, wherein the hydraulic steering system is configured to transition between: an automatic steering mode in which the sensing cylinder is in fluid communication with the steering cylinder to cause the steering cylinder to turn the at least one axle based on a movement of the sensing cylinder; and a manual steering mode in which the controller is in fluid communication with the steering cylinder to cause the steering cylinder to turn the at least one axle based on a user input.

Clause 2: The trailer of clause 1, wherein the plurality of valves comprise a plurality of poppet valves.

Clause 3: The trailer of clause 2, wherein in the automatic steering mode a first arrangement of the plurality of poppet valves are open and closed, and in the manual steering mode a second arrangement of the plurality of poppet valves are open and closed.

Clause 4: The trailer of any of clauses 1-3, wherein a user directs whether the hydraulic steering system is to operate in the automatic steering mode or the manual steering mode by selecting an automatic steering option or a manual steering option.

Clause 5: The trailer of any of clauses 1-4, wherein in the manual steering mode, the user input is received from an input located on the controller selected by a user and/or from a signal received by the controller from a remote controller input by the user.

Clause 6: The trailer of any of clauses 1-5, wherein in the manual steering mode, the user input is configured to cause a fluid to be flowed to and/or from the steering cylinder to cause the steering cylinder to turn the at least one axle.

Clause 7: The trailer of any of clauses 1-6, wherein in the manual steering mode, the steering cylinder is not controlled by the sensing cylinder.

Clause 8: The trailer of any of clauses 1-7, wherein in the automatic steering mode, the sensing cylinder is configured to flow fluid to and/or from the steering cylinder to cause the steering cylinder to turn the at least one axle.

Clause 9: The trailer of any of clauses 1-8, wherein the sensing cylinder is moved by co-action with a cab and/or jeep attached to the trailer.

Clause 10: The trailer of any of clauses 1-9, wherein the trailer body comprises a front half and a rear half, wherein the plurality of axles comprise a first set of axles connected to the front half and a second set of axles connected to the rear half, wherein the first set of axles and/or the second set of axles are configured to be steered by the hydraulic steering system in the automatic steering mode.

Clause 11: The trailer of clause 10, wherein only the second set of axles are configured to be steered by the hydraulic steering system in the automatic steering mode.

Clause 12: The trailer of any of clauses 1-11, wherein the sensing cylinder is connected to a turning component.

Clause 13: The trailer of any of claims 1-12, wherein the sensing cylinder is configured to cause the steering cylinder to turn the at least one axle based on a co-action between a kingpin of the trailer and a fifth wheel on a cab to which the trailer is connected.

Clause 14: A towing system, comprising: a cab; and the trailer of any of clauses 1-13 attached to the cab.

Clause 15: The towing system of clause 14, further comprising a jeep attached to the cab, wherein the trailer is attached to the jeep.

Clause 16: The towing system of clause 14 or 15, wherein the towing system optionally comprises a jeep attached to the cab, wherein the trailer is attached to the cab by a load spanning from the trailer to the jeep or the cab.

Clause 17: A method of steering a trailer including a hydraulic steering system, comprising: providing the trailer of any of clauses 1-13; activating the automatic steering mode or the manual steering mode; and steering the trailer.

Clause 18: The method of clause 17, wherein the manual steering mode is activated, wherein the trailer is steered at a speed maintained at or below 10 miles per hour.

Clause 19: The method of clause 17 or 18, wherein the trailer body comprises a front half and a rear half, wherein the plurality of axles comprise a first set of axles connected to the front half and a second set of axles connected to the rear half, wherein steering the trailer comprises steering the first set of axles and/or the second set of axles with the hydraulic steering system in the automatic steering mode.

Clause 20: The method of any of clauses 17-19, wherein upon the automatic steering mode being activated, no further user input is required to steer the trailer in the automatic steering mode.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
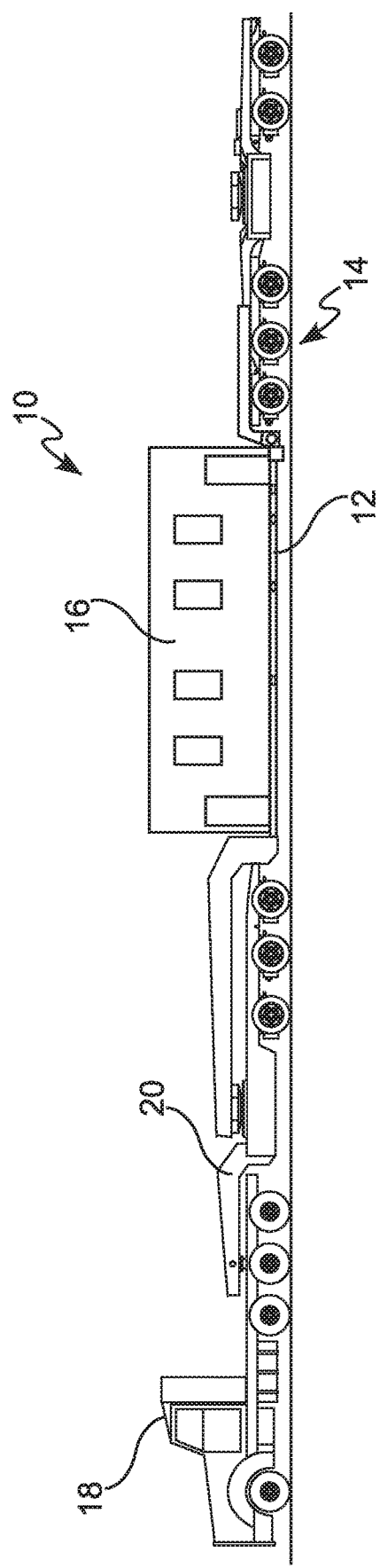
FIG. 1 shows a perspective view of a trailer according to some non-limiting embodiments.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

The present disclosure is directed to a hydraulic steering system for a trailer, such as a trailer hauled by a cab (tractor). The hydraulic steering system includes a hydraulic circuit that is configured to steer at least one axle on the trailer either manually (manual mode) or automatically (automatic mode). The hydraulic steering system can switch between manual and automatic mode.

Referring to FIG. 1, a trailer 10 including a hydraulic steering system is shown according to some non-limiting embodiments. The trailer may include a trailer body 12 and a plurality of axles 14 connected to the trailer body 12. The trailer 10 may include any number of axles 14, such as 4 axles, such as 6 axles, such as 8 axles, such as 10 axles, or the like. Each of the axles 14 may be turnable with respect to the trailer body 12. Each axle 14 may be independently turnable from the other axles 14 in some non-limiting examples. A set of axles may turn together in some non-limiting examples. An axle 14 in a set of axles may turn based on an amount another axle 14 in the set has turned. The axles 14 may include a turntable to enable turning thereof relative to the trailer body 12.

The trailer 10 may be configured to haul a load 16 of various shapes and sizes. The load 16 may be a long load (e.g., I-beams or beams used in the construction of bridges and other infrastructure) or a wide load (e.g., wider than the width of the trailer body 12). However, the trailer 10 may be configured to carry other loads 16, such as large or small loads or loads of an unusual shape.

The trailer 10 may be connected to a cab 18 to form a towing system. The cab 18 may tow the trailer 10 in the towing system. The trailer 10 may be directly connected to the cab 18, such as by a fifth wheel on the cab 18 co-acting with a kingpin on the trailer 10. The trailer 10 may be indirectly connected to the cab 18. For example, the trailer 10 may be connected to a jeep 20 which is connected to the cab 18 or to another trailer 10 which is connected to the cab (see FIG. 1). For example, the trailer 10 may be connected to the trailer 10 by a load which spans therebetween or between the trailer 10 and the jeep 20 connected to the cab 18 (see FIG. 8). The trailer 10 may be a low boy trailer connected to the jeep 20 connected to the cab 18.

Referring to FIGS. 1-8, the trailer 10 including a hydraulic steering system is shown.

Figure 2:
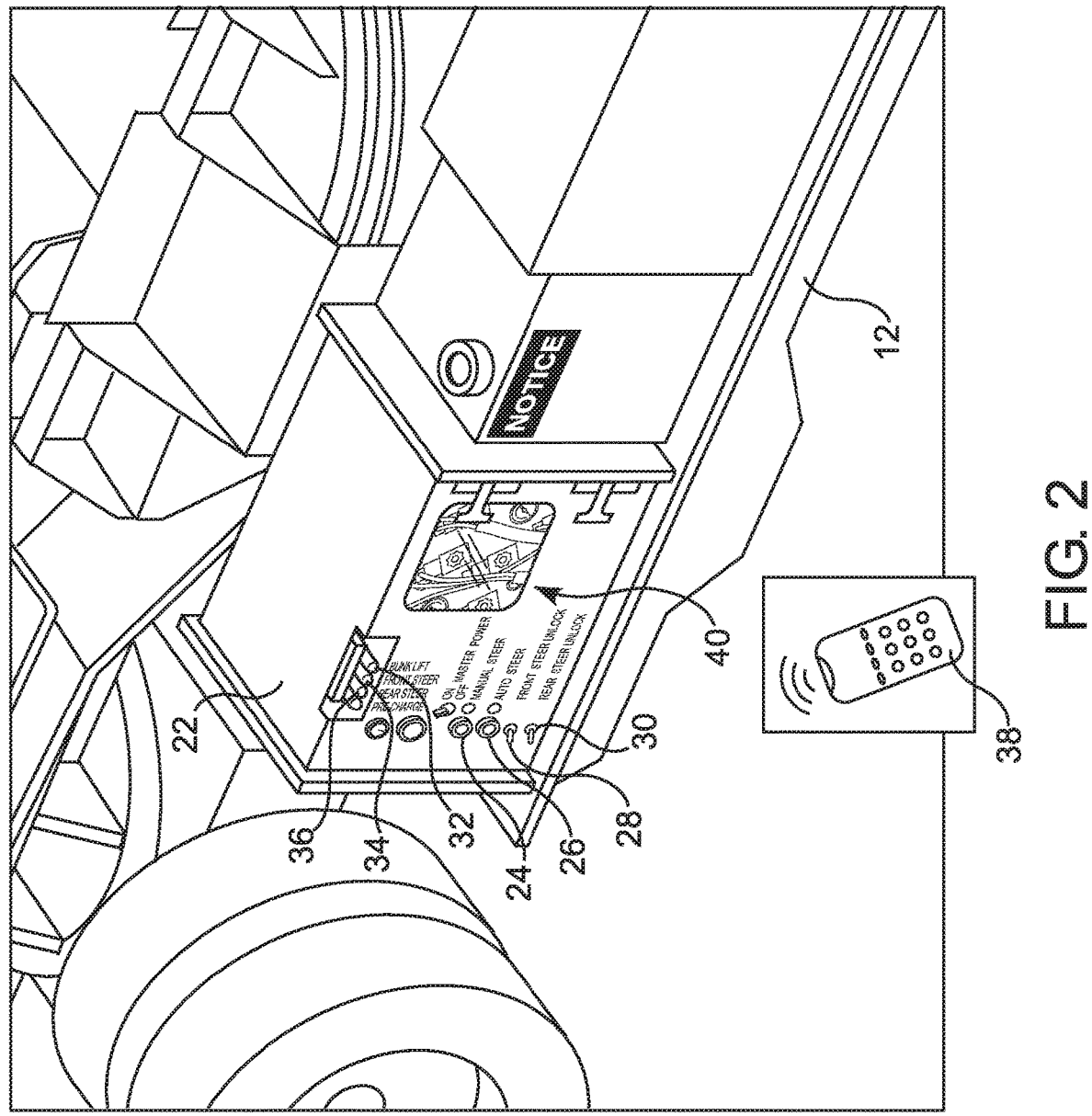
FIG. 2 shows a perspective view of a controller of a trailer according to some non-limiting embodiments.
Figure 3:
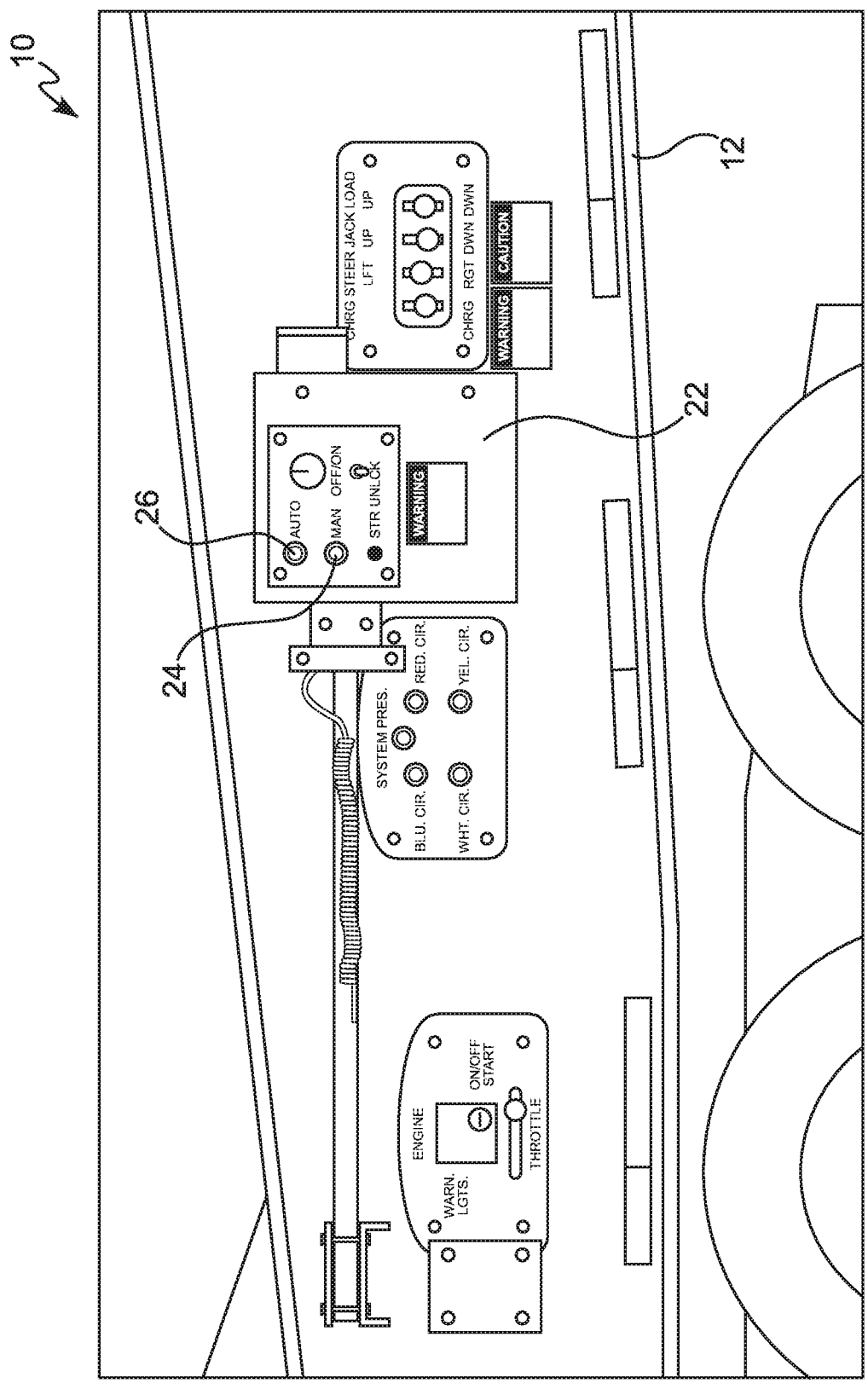
FIG. 3 shows a perspective view of another controller of a trailer according to some non-limiting embodiments.

Referring to FIGS. 2 and 3, a controller 22 may be positioned on the trailer 10. The controller 22 may enable a user to control a hydraulic circuit on the trailer 10 for transitioning the trailer 10 between a manual steering mode and an automatic steering mode. The controller 22 may include a manual steering option 24 to cause the trailer 10 to operate in manual steering mode (as defined hereinafter). The controller 22 may include an automatic steering option 26 to cause the trailer 10 to operate in automatic steering mode (as defined hereinafter). The manual steering option 24 and/or the automatic steering option 26 may include any selectable option configured to be engaged by the user to initiate the manual steering mode and/or the automatic steering mode, which may include a push button, switch, a lever, a trigger, a selectable option on a graphical user interface (e.g., a touchscreen option), a voice-enabled option, and the like.

Figure 8:
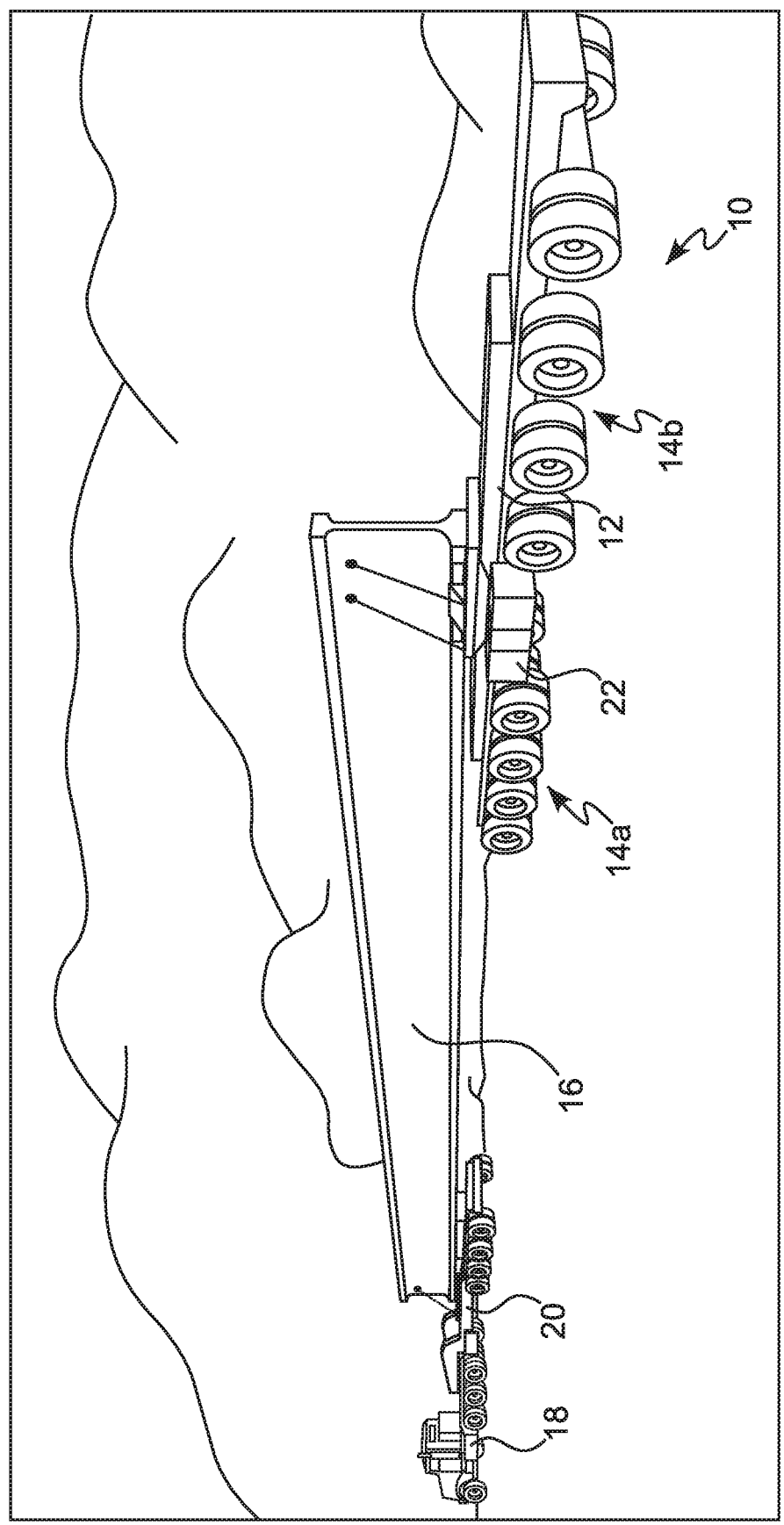
FIG. 8 shows a perspective view of a trailer hauling a long load according to some non-limiting embodiments.

The controller 22 may include an automatic front steer control option 28 and/or an automatic rear steer control option 30. Referring to FIGS. 2 and 8, the trailer 10 may have a first set of axles 14a and a second set of axles 14b. The first set of axles 14a may be connected to the front half of the trailer 10, and the second set of axles 14b may be connected to the rear half of the trailer 10. Each axle in a set of axles may be connected to an adjacent axle in the same set of axles to cause the axles to turn together (e.g., by tie rods). Each axle in the set of axles may turn independently of the other axles in the same set. Selecting the automatic front steer control option 28 may enable the user to steer the first (front) set of axles 14a of the trailer 10 in automatic steering mode. Selecting the automatic rear steer control option 30 may enable the user to steer the second (rear) set of axles 14b of the trailer 10 in automatic steering mode. Selecting the automatic front steer control option 28 and the automatic rear steer control option 30 may enable the user to steer both the first (front) set of axles 14a and the second (rear) set of axles 14b of the trailer 10 in automatic steering mode. In some non-limiting examples, only the first (front) set of axles 14a of the trailer 10 may be steered in automatic steering mode. In some non-limiting examples, only the second (rear) set of axles 14b of the trailer 10 may be steered in automatic steering mode.

The controller 22 may include a bunk lift option 32, which enables a user to adjust the position of a bunk on the trailer 10, such as adjusting the bunk up, down, left, right, forward, and/or backward.

The controller 22 may include a manual front steer control 34 and/or a manual rear steer control 36. The manual front steer control 34 may enable the user to manually steer (e.g., turn) the first (front) set of axles 14a of the trailer 10 when the trailer 10 is in manual steering mode. The manual rear steer control 36 may enable the user to manually steer (e.g., turn) the second (rear) set of axles 14b of the trailer 10 when the trailer 10 is in manual steering mode. Selecting the manual front steer control 34 and the manual rear steer control 36 may enable the user to manually steer both the first (front) set of axles 14a and the second (rear) set of axles 14b of the trailer 10.

The user engaging the manual front steer control 34 may cause the first (front) set of axles 14a of the trailer 10 (or some subset of axles thereof) to turn left or right. The user engaging the manual rear steer control 36 may cause the second (rear) set of axles 14b of the trailer 10 (or some subset of axles thereof) to turn left or right The user may use these controls to control the degree to which the axles 14 turn. Thus, in some non-limiting examples, the user may manually steer the axles 14 of the trailer 10 by engaging the manual front steer control 34 and/or the manual rear steer control 36 on the controller 22.

In some non-limiting embodiments, with the manual steering option 24 enabled such that the trailer 10 is operated in manual steering mode, the user may remotely turn the axles 14 of the trailer 10 (or some subset of the axles 14). The user may use a remote control 38 to cause the remote control 38 to remotely communicate with the controller 22 to turn the axles 14 of the trailer 10. The user may select an option on the remote control 38 to cause the first (front) set of axles 14*a* of the trailer 10 (or some subset of axles thereof) to turn left or right. The user may select an option on the remote control 38 to cause the second (rear) set of axles 14*b* of the trailer 10 (or some subset of axles thereof) to turn left or right. Thus, in some non-limiting examples, the user may remotely manually steer the axles 14 of the trailer 10 by engaging remote control 38.

In some non-limiting embodiments, the remote control 38 may communicate with the controller to activate other of the previously-described controls, such as the manual steering option 24, the automatic steering option 26, the automatic front steer control option 28, the automatic rear steer control option 30, the bunk lift option 32, or other options physically located on the controller 22 or the trailer 10. The remote control 38 may further communicate with other components of the hydraulic steering system, such as components of the hydraulic circuit comprising a plurality of hoses and valves as described hereinafter. For example, the remote control 38 may activate and/or deactivate certain valves in the hydraulic circuit of the hydraulic steering system.

Referring to FIGS. 4-7, the hydraulic steering system may include a hydraulic circuit 44. A manifold 40 may be included in the hydraulic circuit 44 to regulate the various components of the hydraulic circuit 44 (e.g., pumps (not shown), valves 46, hoses 48, and the like). The manifold 40 may house at least one hydraulic gauge 42, and the hydraulic gauge 42 may display a reading of a parameter associated with the hydraulic circuit 44. In some non-limiting examples, the gauge 42 may read a pressure flowing through a hose 48 of the hydraulic circuit 44.

The hydraulic steering system may include at least one steering cylinder 50 connected to at least one axle 14 of the trailer 10. The steering cylinder 50 may co-act with the at least one axle 14 to turn the at least one axle 14. Each axle or set of axles may have at least one steering cylinder 50 separate from a steering cylinder 50 of another axle or set of axles. The hydraulic steering system may include at least one sensing cylinder 52 on the trailer 10. The steering cylinder 50 may be in fluid and/or electrical communication with at least one of the sensing cylinder 52 and/or the controller 22. The sensing cylinder 52 may be in fluid and/or electrical communication with the steering cylinder 50 and/or the controller 22.

Figure 7:
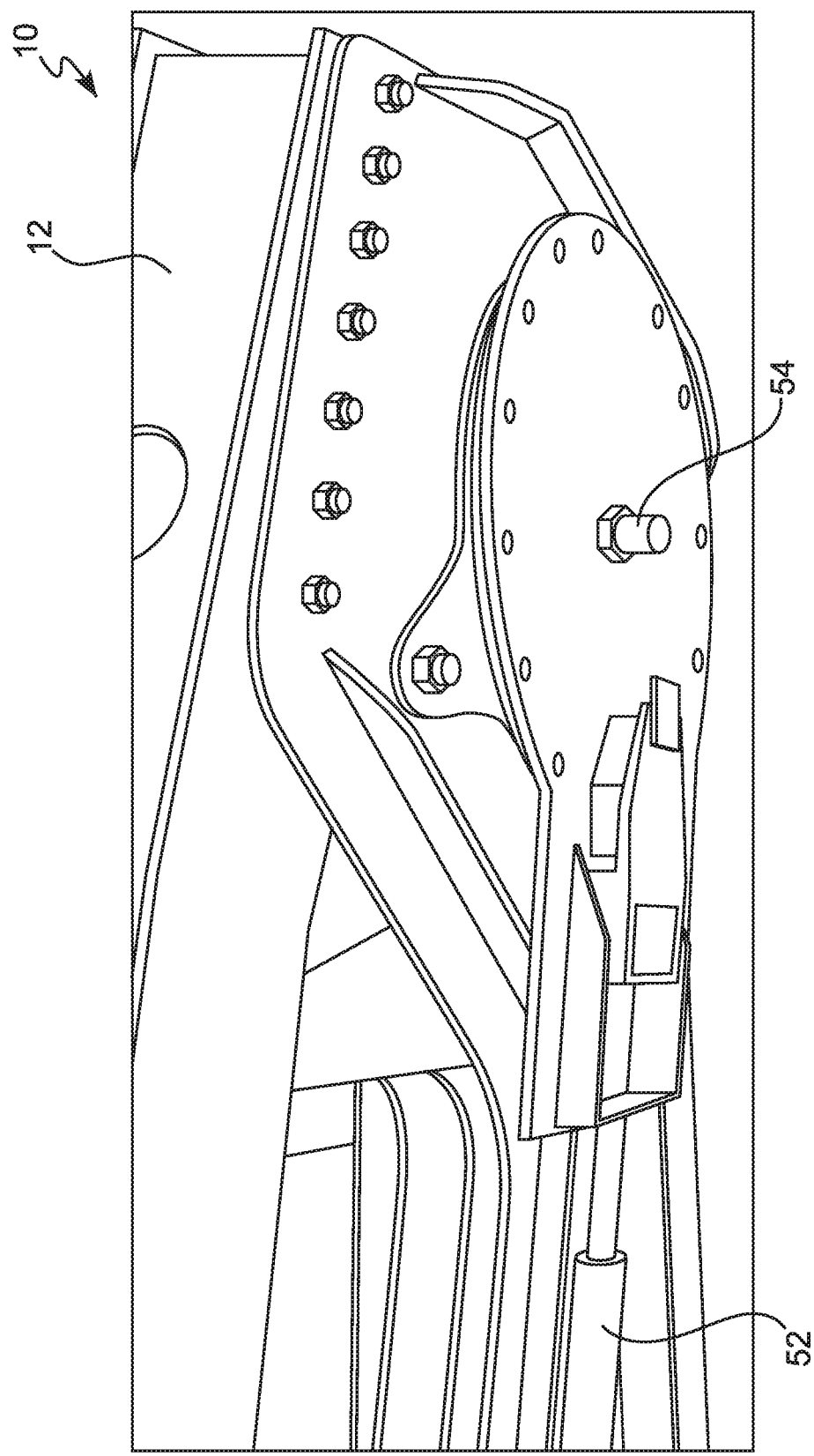
FIG. 7 shows a perspective view of a trailer having a kingpin attachable to a fifth wheel of a cab to co-act with a sensing cylinder according to some non-limiting embodiments.

As previously discussed, the trailer 10 is configured to switch between operating in manual steering mode and automatic steering mode. In automatic steering mode, the sensing cylinder 52 is configured to be in fluid communication with the steering cylinder 50 to cause the steering cylinder 50 to turn the axles 14 left or right based on a movement of the sensing cylinder 52 (which may be moved based on a turning component of the trailer 10, cab 18, and or jeep 20). No input from a user may be required to steer the trailer while in automatic steering mode. The sensing cylinder 52, by moving, may cause fluid (e.g., liquid (e.g., oil) or gas (e.g., air)) to be pushed to and/or from the steering cylinder 50 to turn the axles 14. In some non-limiting examples, the sensing cylinder 52 is moved by co-action with the cab 18 or jeep 20 attached to the trailer 10. For example, the cab 18 or jeep 20 making a turn left or right may move the sensing cylinder 52 a corresponding amount to cause fluid to be pushed to and/or from the steering cylinder 50 to turn the axles 14. In some non-limiting examples, the sensing cylinder 52 is moved by co-action with (e.g., being attached to or in communication with) another turning component of the trailer 10, cab 18, or jeep 20. The turning component may include a turning bunk (see e.g., FIG. 8) located on at least one of the trailer 10, cab 18, or jeep 20. The turning bunk may support the load 16, and movement of the load 16 (e.g., from the cab 18 turning) may turn the turning bunk, which may result in co-action with the sensing cylinder 52 to cause fluid to be pushed to and/or from the steering cylinder 50 to turn the axles 14. Referring to FIG. 7, in some non-limiting examples, the sensing cylinder 52 may be moved by co-action with a kingpin 54 of the trailer 10 co-acting with a fifth wheel (not shown) on the cab 18 and/or jeep 20 to which the trailer 10 is connected. For example, the turning of the cab 18 and/or jeep 20 may cause the kingpin 54 inserted into the fifth wheel to move, which may cause the sensing cylinder 52 to move, which may cause fluid to be pushed to and/or from the steering cylinder 50 to turn the axles 14. In the automatic steering mode, the steering cylinder 50 may not be controlled by a user input from the controller 22 (as in manual steering mode) but may be controlled by movement of the sensing cylinder 52. In some non-limiting examples, the steering cylinder 50 may not be in fluid communication with the controller 22 in automatic steering mode.

With continued reference to FIGS. 4-7, in manual steering mode, the controller 22 may be in fluid communication with the steering cylinder 50 to cause the steering cylinder 50 to turn the axles 14 based on a user input (e.g., from the remote control, manual front steer control 34, manual rear steer control 36, and the like). The user input to the controller 22 may cause fluid to be pushed to and/or from the steering cylinder 50 to turn the axles 14. In manual steering mode, the steering cylinder 50 may not be controlled by a movement of the sensing cylinder 52. In some non-limiting examples, the steering cylinder 50 may not be in fluid communication with the sensing cylinder 52 in manual steering mode.

Referring again to FIG. 4, the plurality of hoses 48 and valves 46 forming the hydraulic circuit 44 may connect (place in fluid communication) certain components of the trailer 10 (and the hydraulic steering system thereof) to enable the trailer to be operated in manual steering mode or automatic steering mode. For example, in manual steering mode, the controller 22 and the steering cylinder 50 may be in fluid communication. For example, in automatic steering mode, the sensing cylinder 52 and the steering cylinder 50 may be in fluid communication. In some non-limiting examples, the plurality of valves 46 include a plurality of poppet valves which may be activated and deactivated opened and closed, depending on whether the user wishes to enable the manual steering mode or automatic steering mode. A first arrangement of the plurality of valves 46 may be opened and closed to enable the trailer 10 to operate in automatic steering mode, and a second (different) arrangement of the plurality of valves 46 may be opened and closed to enable the trailer 10 to operate in manual steering mode. A different arrangement of the plurality of valves 46 may be opened and closed to enable the trailer 10 to control the first (front) set of axles 14a and/or the second (rear) set of axles 14b in automatic steering mode and/or manual steering mode. Valves 46 may be opened or closed by an electrical signal being communicated to the valve 46 to be opened or closed or by disabling an electrical signal being communicated to the valve 46 to be opened or closed. Valves 46 may be opened or closed manually by a user.

Figure 4:
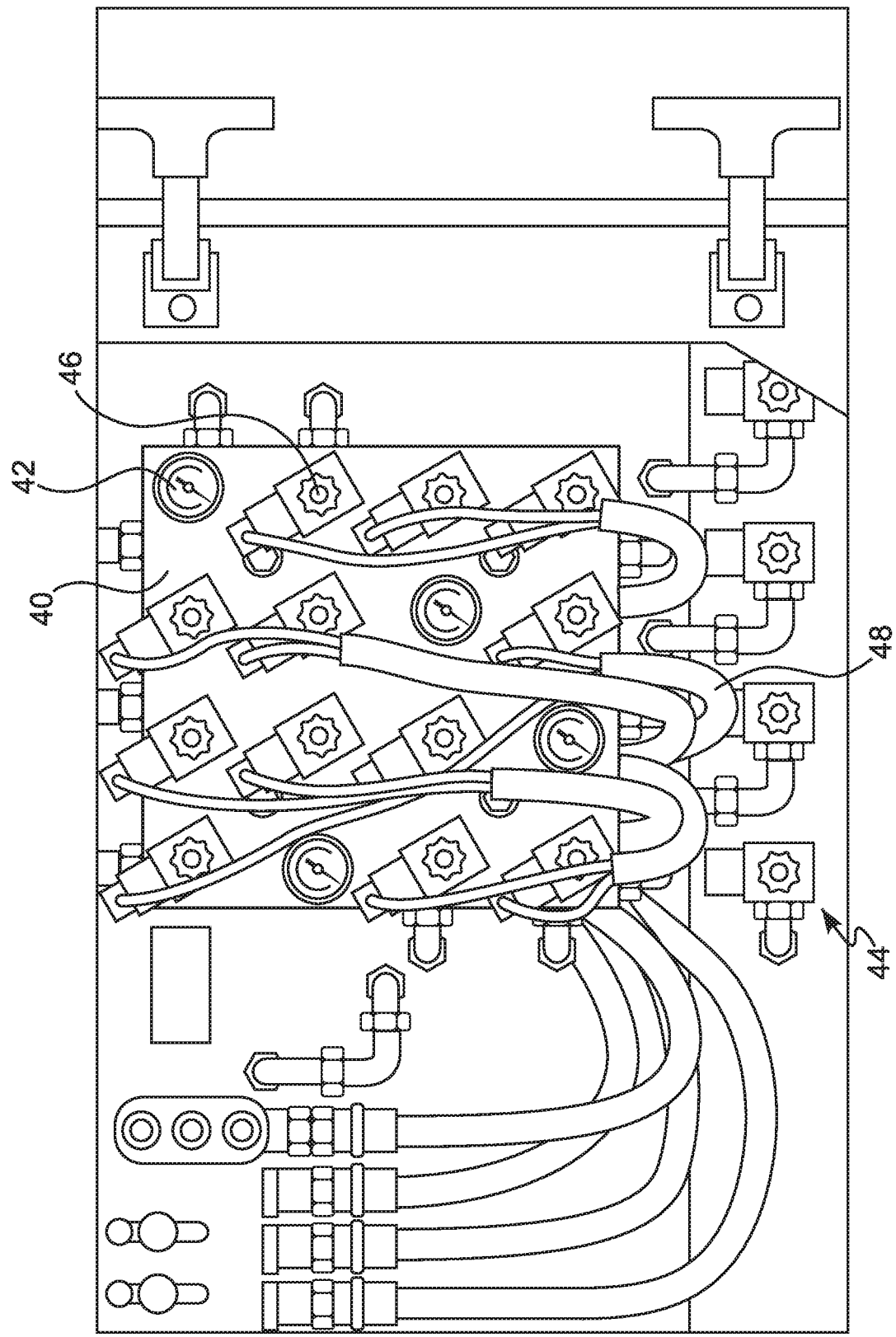
FIG. 4 shows a perspective view of a manifold including a plurality of valves, hoses, and gauges according to some non-limiting embodiments.
Figure 5:
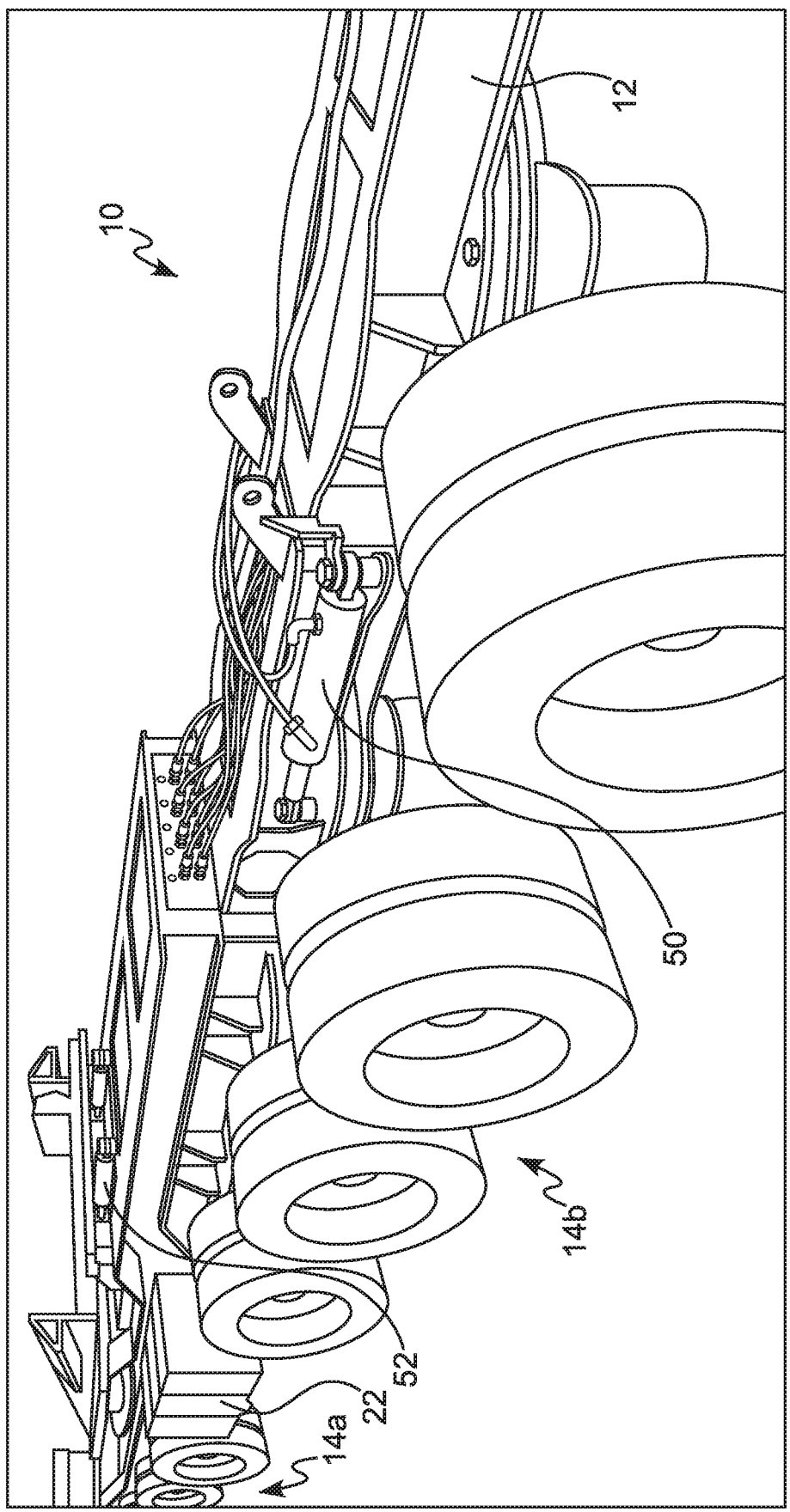
FIG. 5 shows a perspective view of a trailer having sensing and steering cylinders according to some non-limiting embodiments.
Figure 6:
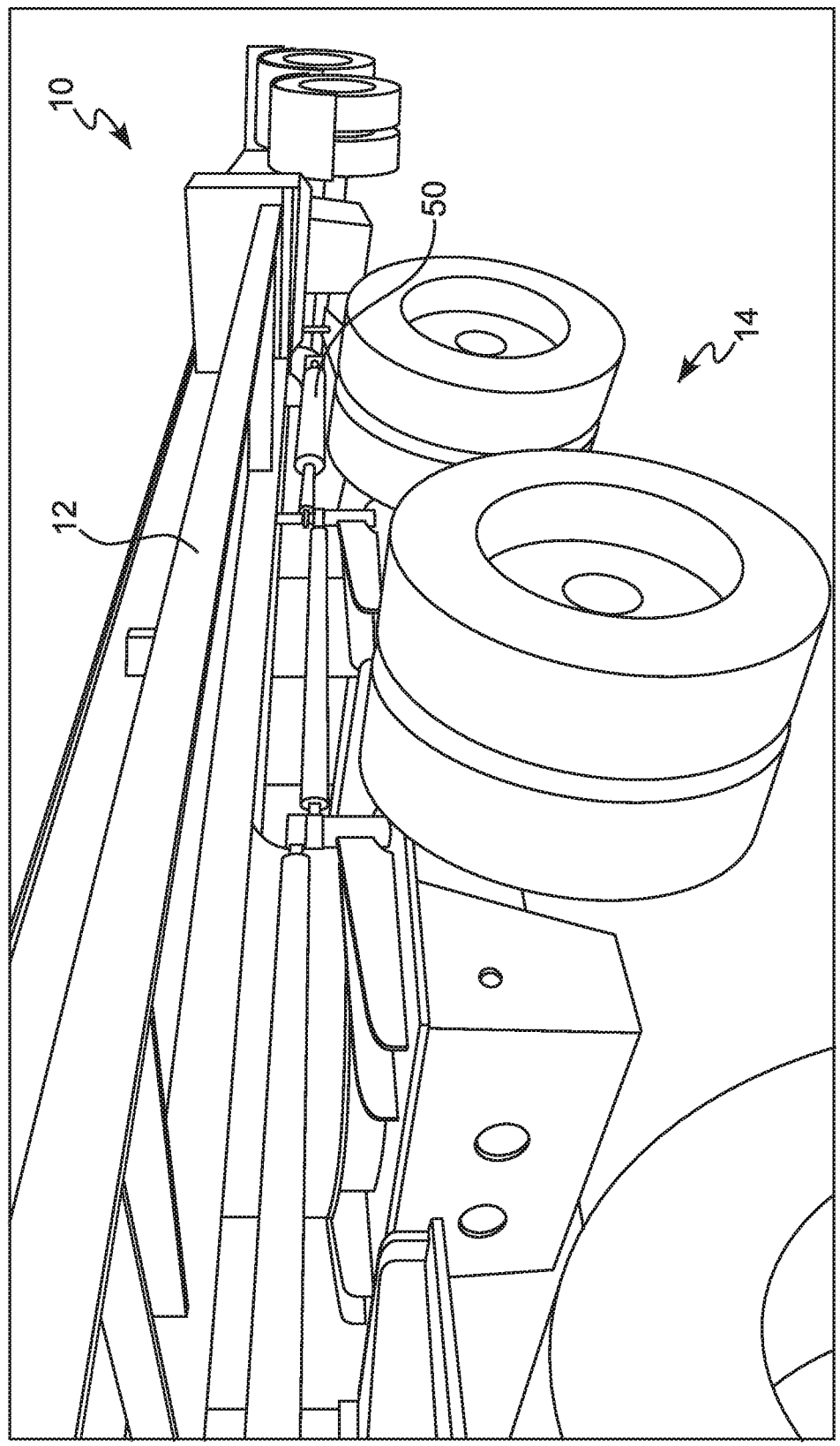
FIG. 6 shows a perspective view of steering cylinders of a trailer according to some non-limiting embodiments.

With continued reference to FIG. 4, in the event of an electrical failure, the hydraulic steering system may be configured to enable a user to manually override the plurality of valves 46. The plurality of valves 46 may typically (when not overridden) receive an electric signal to open or close, but they can also be overridden in the event of an electrical failure to open or close with manual actuation (e.g., turning by hand of a screw type dial on each valve) by the user. This is a valuable safety feature that enables a user to activate automatic steering mode and/or manual steering mode even in the event of an electrical failure. The default arrangement for the plurality of valves 46 may be an arrangement associated with automatic steering mode. In the event of an electrical failure, the plurality of valves may be automatically moved to the default arrangement (e.g., by the electrical signal to all valves being disabled such that the valves are set to the default position), such that the trailer 10 operates in automatic steering mode immediately following an electrical failure.

The trailer 10 as described herein may be steered by providing the trailer 10. A user may activate automatic steering mode or manual steering mode (for all axles 14 or only a subset thereof (e.g., front axles 14a, rear axles 14b, and/or both)). The trailer 10 may then be steered in the activated steering mode. The trailer 10 may be steered in response to the trailer 10 moving in any direction. The trailer 10 may be moved (and steered) by itself (not attached to any other components). The trailer 10 may be moved (and steered) while attached to the cab 18 and/or the jeep 20, such as by the cab 18 and/or the jeep 20 towing the trailer 10. Movement of the cab 18 and/or the jeep 20 may cause the trailer to be moved (and steered).

In some non-limiting examples, the trailer 10 may be steered in automatic steering mode at any speed at which the trailer moves. Upon automatic steering mode being activated, no further user input may be required to steer the trailer 10 in automatic steering mode. In some non-limiting examples, the trailer 10 may be steered in manual steering mode at speeds of the trailer 10 being maintained at or below 10 miles per hour, such as at or below 7 miles per hour.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

The invention claimed is:

1. A trailer including a hydraulic steering system, comprising:
   a trailer body;
   a plurality of axles connected to the trailer body, wherein each of the plurality of axles is turnable;
   a steering cylinder connected to at least one axle of the plurality of axles and configured to turn the at least one axle;
   a sensing cylinder;
   a controller; and
   a hydraulic steering system, comprising a hydraulic circuit comprising a plurality of hoses and valves, the steering cylinder in fluid communication with at least one of the sensing cylinder and the controller,
   wherein the hydraulic steering system is configured to transition between:
      an automatic steering mode in which the sensing cylinder is in fluid communication with the steering cylinder to cause the steering cylinder to turn the at least one axle based on a movement of the sensing cylinder; and
      a manual steering mode in which the controller is in fluid communication with the steering cylinder to cause the steering cylinder to turn the at least one axle based on a user input.

2. The trailer of claim 1, wherein the plurality of valves comprise a plurality of poppet valves.

3. The trailer of claim 2, wherein in the automatic steering mode a first arrangement of the plurality of poppet valves are open and closed, and in the manual steering mode a second arrangement of the plurality of poppet valves are open and closed.

4. The trailer of claim 1, wherein a user directs whether the hydraulic steering system is to operate in the automatic steering mode or the manual steering mode by selecting an automatic steering option or a manual steering option.

5. The trailer of claim 1, wherein in the manual steering mode, the user input is received from an input located on the controller selected by a user and/or from a signal received by the controller from a remote controller input by the user.

6. The trailer of claim 1, wherein in the manual steering mode, the user input is configured to cause a fluid to be flowed to and/or from the steering cylinder to cause the steering cylinder to turn the at least one axle.

7. The trailer of claim 1, wherein in the manual steering mode, the steering cylinder is not controlled by the sensing cylinder.

8. The trailer of claim 1, wherein in the automatic steering mode, the sensing cylinder is configured to flow fluid to and/or from the steering cylinder to cause the steering cylinder to turn the at least one axle.

9. The trailer of claim 1, wherein the sensing cylinder is moved by co-action with a cab and/or jeep attached to the trailer.

10. The trailer of claim 1, wherein the trailer body comprises a front half and a rear half,
    wherein the plurality of axles comprise a first set of axles connected to the front half and a second set of axles connected to the rear half,
    wherein the first set of axles and/or the second set of axles are configured to be steered by the hydraulic steering system in the automatic steering mode.

11. The trailer of claim 10, wherein only the second set of axles are configured to be steered by the hydraulic steering system in the automatic steering mode.

12. The trailer of claim 1, wherein the sensing cylinder is connected to a turning component.

13. The trailer of claim 1, wherein the sensing cylinder is configured to cause the steering cylinder to turn the at least one axle based on a co-action between a kingpin of the trailer and a fifth wheel on a cab to which the trailer is connected.

14. A towing system, comprising:
a cab; and
the trailer of claim 1 attached to the cab.

15. The towing system of claim 14, further comprising a jeep attached to the cab, wherein the trailer is attached to the jeep.

16. The towing system of claim 14, wherein the towing system optionally comprises a jeep attached to the cab,
wherein the trailer is attached to the cab by a load spanning from the trailer to the jeep or the cab.

17. A method of steering a trailer including a hydraulic steering system, comprising:
providing the trailer of claim 1;
activating the automatic steering mode or the manual steering mode; and
steering the trailer.

18. The method of claim 17, wherein the manual steering mode is activated,
wherein the trailer is steered at a speed maintained at or below 10 miles per hour.

19. The method of claim 17, wherein the trailer body comprises a front half and a rear half,
wherein the plurality of axles comprise a first set of axles connected to the front half and a second set of axles connected to the rear half,
wherein steering the trailer comprises steering the first set of axles and/or the second set of axles with the hydraulic steering system in the automatic steering mode.

20. The method of claim 17, wherein upon the automatic steering mode being activated, no further user input is required to steer the trailer in the automatic steering mode.

\* \* \* \* \*